United States Patent

Luger et al.

[11] Patent Number: 5,505,053
[45] Date of Patent: Apr. 9, 1996

[54] CRYOSYSTEM

[75] Inventors: Peter Luger, Höhenkirchen; Franz Grafwallner, Tegernsee; Helmuth Peller, Höhenkirchen; Martin Müller, Höhenkirchen-Siegertsbrunn, all of Germany; Valentin V. Malyshev; Alexsander S. Shengardt, both of Moscow, Russian Federation

[73] Assignee: Deutsche Aerospace AG, Munich, Germany

[21] Appl. No.: 351,834

[22] Filed: Dec. 8, 1994

[30] Foreign Application Priority Data

Dec. 10, 1993 [DE] Germany ................... 43 42 207.1

[51] Int. Cl.[6] ................ F17C 7/02; F17C 13/00
[52] U.S. Cl. ............... 62/50.1; 62/50.2; 62/50.7; 220/901
[58] Field of Search ................... 62/50.1, 50.2, 62/50.7, 51.1, 51.3

[56] References Cited

U.S. PATENT DOCUMENTS

| | | | |
|---|---|---|---|
| 3,069,042 | 12/1962 | Johnston | 62/51.3 X |
| 3,186,480 | 6/1965 | Sauer | 62/50.7 X |
| 3,797,263 | 3/1974 | Shahir et al. | 62/50.1 |
| 4,625,753 | 12/1986 | Gustafson | 62/50.7 X |
| 4,718,239 | 1/1988 | Nowabilski et al. | 62/50.7 X |
| 4,766,731 | 8/1988 | Graczyk et al. | 62/51.3 |
| 5,271,232 | 12/1993 | Ogawa et al. | 62/50.1 |

*Primary Examiner*—Christopher Kilner
*Attorney, Agent, or Firm*—McGlew and Tuttle

[57] ABSTRACT

Cryosystem for cryogenic liquids which contain small amounts of foreign fluids with higher melting and boiling points, wherein the cryosystem comprises at least one tank, pipelines and assembly units and is used under defined gravitation conditions. The pipelines slope, at least in some areas, toward the tank, and areas of the pipelines and assembly units, from which the cryogenic liquid and the foreign fluids cannot flow back into the tank under the action of gravity, are provided with drain openings and drain lines, which open into the tank or into at least one additional collection tank.

10 Claims, 1 Drawing Sheet

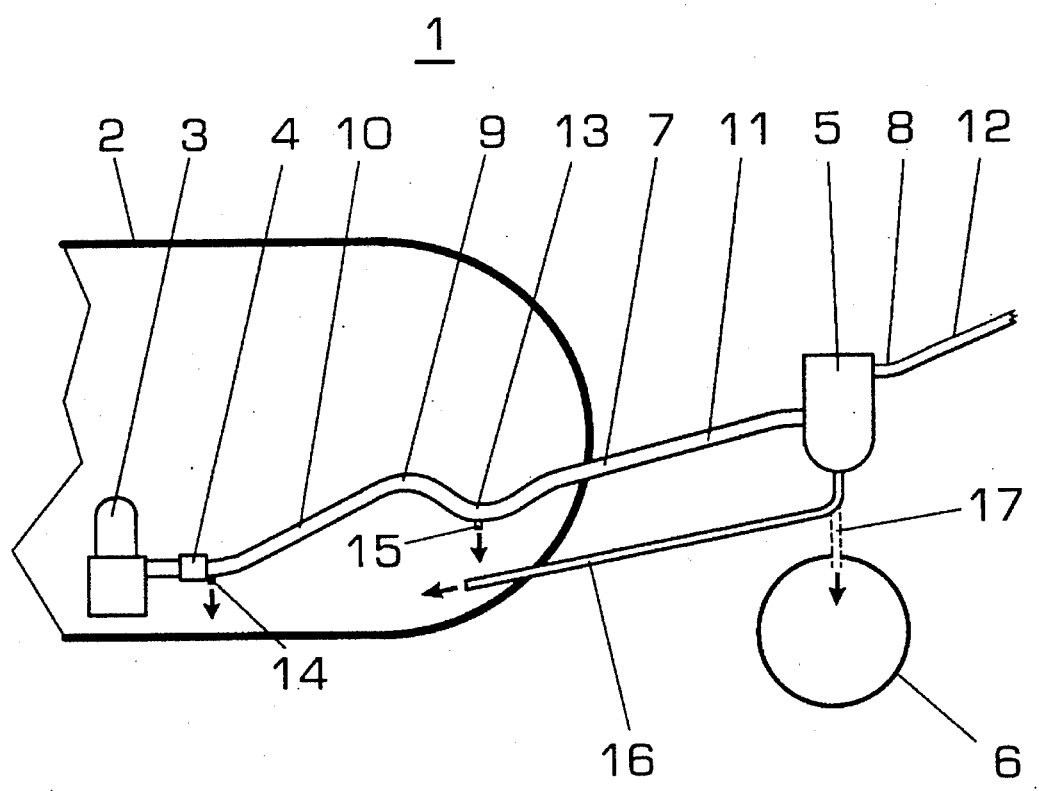

CRYOSYSTEM

FIELD OF THE INVENTION

The present invention pertains to a cryosystem for cryogenic liquids which contain small amounts of foreign fluids with higher melting and boiling points, especially for liquid hydrogen, liquid methane or liquid natural gas, with foreign fluids, e.g., oxygen and nitrogen, wherein the cryosystem comprises at least one tank, pipelines and assembly units, e.g., pumps, valves and filters, and is used under defined gravitation conditions as a stationary or mobile system with prolonged, quasistationary states of movement, especially as a fuel system for a large aircraft.

BACKGROUND OF THE INVENTION

A small amount of dissolved foreign fluids is practically always present in cryogenic liquids for technical applications of the purity usually used for this purpose. Thus, commercially available liquid hydrogen contains, e.g., dissolved oxygen, nitrogen and other substances.

As long as these impurities are present in the cryogenic liquid uniformly at low concentration and in the liquid state, they are usually unproblematic and no attention needs to be paid to them.

However, problems and hazards may develop when local enrichments of these foreign substances are formed. Such enrichments or deposits develop primarily if the foreign fluids have higher melting and boiling points and a higher specific gravity than the cryogenic carrier fluid.

During normal operation, the foreign fluids are transported practically into all areas of the cryosystem to which there is flow, i.e., into lines and various types of assembly units, as a consequence of the flow conditions.

During an interruption in the operation, cryogenic liquid initially remains in areas of the pipelines and assembly units. This cryogenic liquid cannot flow back into the tank under the action of gravity for construction-and function-related reasons. However, the cryogenic liquid is the first to evaporate due to heat supply from the environment and as a consequence of its lower boiling point, and it escapes from the said areas, preferably in the direction of the tank. The higher-melting and higher-boiling foreign substances remain behind in the liquid or even solid, frozen form.

Increasing amounts of foreign substances can accumulate in the said areas as the number of phases of operation and interruptions in operation increase, until critical concentrations develop locally. Explosions may occur in the extreme case at the time of the subsequent start-up of the system, i.e., at the time of the first contact of the cryogenic liquid flowing in with the concentrated foreign substances. There is a risk of explosion especially on contact of combustible cryogenic liquids with accumulations of oxygen. The oxyhydrogen gas reaction of hydrogen and oxygen is generally known in this connection.

The fact that frozen impurities reduce or block flow cross sections or impede or block the movement of moving functional elements, such as valve pistons, slide valves, pump impellers, etc., has less devastating, but still critical consequences.

SUMMARY AND OBJECTS OF THE INVENTION

In light of these problems and risks, the object of the present invention is to provide a cryosystem for cryogenic liquids which contain small amounts of foreign fluids with higher melting and boiling points, which prevents the formation of local accumulations of foreign substances and which operates with an essentially higher level of safety and reliability as a result.

According to the invention, a cryosystem is provided for cryogenic liquids which contain small amounts of foreign fluids with higher melting and boiling points, especially for liquid hydrogen, liquid methane or liquid natural gas, with foreign fluids, e.g., oxygen and nitrogen, wherein the cryosystem comprises at least one tank, pipelines and assembly units, e.g., pumps, valves and filters, and is used under defined gravitation conditions as a stationary or mobile system with prolonged, quasistationary states of movement, especially as a fuel system for a large aircraft. The cryosystem of the invention provides the majority of the pipelines or all the pipelines outside the tank sloped toward the tank at least in some areas. Further, siphon-like, temporarily closed areas (settling lines, dead water zones) and other areas of the pipelines and assembly units, from which the cryogenic liquid and the foreign fluids cannot flow back to the tank under the action of gravity, are provided with drain openings or drain lines, which open into the tank and/or into at least one additional collection tank.

Some sections or the entire length of pipelines are designed sloping toward the tank, so that there is a defined tendency for liquid to flow back to the tank in the lines during interruptions in operation of the system or of individual areas of the system. Areas of pipelines and assembly units, from which such drainage is not possible, are intentionally provided with drain openings or drain lines, which open into the tank or into at least one additional collection tank with a slope.

The longer pipeline sections, extending inside the tank, are also sloped, at least in some areas, toward their upstream end. The drain openings, opening into the tank and the drain lines end on the outlet side into areas of the tank through which flow passes with certainty during the filling of the tank in order to eliminate enrichments of foreign fluids in the solid and/or liquid form which are present there by distribution and dissolution.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWING

In the drawing:

The only figure shows parts of a cryosystem with line elements, assembly units and a partial longitudinal section of the tank in a highly simplified, rather schematic representation.

DETAILED DESCRIPTION OF THE PREFERRED EMBODIMENTS

The cryosystem 1 is, e.g., the fuel system of a commercial airplane and comprises cryogenic tank means for storing cryogenic fluid (liquids that boil at low temperatures—less than about 110° K. at atmospheric pressure). The cryogenic tank means includes at least one tank 2 as a storage container for the cryogenic liquid, which may be, e.g., liquid hydrogen, liquid methane or liquid natural gas. The tank is maintained at temperatures allowing the stored material to be maintained as a liquid. The refrigeration equipment and other features to achieve operations at very low temperatures are known per se and are not the subject of the present invention. The liquid is drawn off from the tank 2 by means of at least one pump 3. A valve 4, e.g., a nonreturn valve, is arranged downstream of the pump 3. The line system proper, here in the form of pipelines 7 and 8, begins downstream of the valve 4. The pipeline 7 has a longer section 9 extending within the tank 2 with an area 10 dropping obliquely towards the valve 4 as well as with a siphon-like area 13. Outside the tank 2, the pipeline 7 extends to a filter 5 with an area 11, which likewise drops obliquely toward the tank 2. The filter 5 is joined by another pipeline 8 with a sloped disposition (sloped area) 12.

The pipeline system shown has three marked areas, from which the cryogenic liquid cannot flow off during interruptions in operation of the cryosystem 1 despite the fact that the line drops toward or into the tank. These areas are the upstream, lower end of the area 10 next to the valve 4, to the right of the valve, the lowest point of the siphon-like area 13, as well as the bottom area of the filter 5. It should be remembered in this connection that the valve 4 is preferably a nonreturn valve, which prevents the liquid from flowing back into the tank 2 through the pump 3 during interruptions in operation.

Without the present invention, the three areas would be critical concerning the deposit and the enrichment of foreign substances with melting and boiling points higher than those of the cryogenic carrier liquid.

However, drain openings 14 and 15, as well as a drain line 16, which guarantee a slow but certain return of dammed-up liquid into the tank 2, are present according to the present invention. As an alternative, a drain line 17, which opens into an additional collection tank 6, is shown by broken line as an alternative embodiment according to the invention.

The drain openings and lines naturally generate a certain return of cryogenic liquid during operation as well. However, since their cross sections are substantially smaller than those of the main lines, the return flows are hardly relevant as losses in throughput. The drain rate is set to be low based on the cross section of the drain being substantially smaller than the cross section of the pipeline (main line).

The desired return or discharge of cryogenic liquid during interruptions in operation is consequently achieved according to the present invention by pipelines sloping toward or into the tank, on the one hand, and by the provision of locally acting drain openings and lines, on the other hand. Enrichments of foreign substances that may develop in the tank are distributed and dissolved during filling by a directed guiding of the flow.

While specific embodiments of the invention have been shown and described in detail to illustrate the application of the principles of the invention, it will be understood that the invention may be embodied otherwise without departing from such principles.

What is claimed is:

1. A cryosystem for cryogenic liquids which contain small amounts of foreign fluids with higher melting and boiling points, the cryogenic liquids being one of liquid hydrogen, liquid methane or liquid natural gas, with foreign fluids being one of oxygen and nitrogen, the cryosystem being used under defined gravitation conditions as a stationary or mobile system with prolonged, quasistationary states of movement, the cryosystem comprising:

a cryogenic tank; a pipeline connected to the tank; a unit including at least one of a pump, a valve and a filter, said unit being connected to one of said cryogenic tank and said pipeline, a majority of a length of said pipeline outside said tank being sloped toward said tank in pipeline slope areas; a siphon-like area of said pipeline being provided between said slope areas; and drain means for draining said pipeline at a drain rate, said drain means including openings or drain lines, said drain means being connected to said pipeline at said siphon-like area and adjacent to said unit, from which the cryogenic liquid and the foreign fluids cannot flow back to said tank under the action of gravity, said drain means opening into one of said tank and/or into at least one additional collection tank.

2. Cryosystem in accordance with claim 1, wherein a section of said pipeline extending inside said tank is also sloped, at least in some areas, toward an upstream pipeline end.

3. Cryosystem in accordance with claim 1, wherein said drain means comprises drain openings and drain lines connected to said pipeline, said drain openings opening into said tank and said drain lines terminating at an outlet side into areas of the tank through which flow passes with certainty during the filling of the tank in order to eliminate enrichments of foreign fluids in the solid and/or liquid form which are present there by distribution and dissolution.

4. Cryosystem in accordance with claim 2, wherein said drain means comprises drain openings and drain lines connected to said pipeline, said drain openings opening into said tank and said drain lines terminating at an outlet side into areas of the tank through which flow passes with certainty during the filling of the tank in order to eliminate enrichments of foreign fluids in the solid and/or liquid form which are present there by distribution and dissolution.

5. Cryosystem in accordance with claim 1, wherein the cryosystem comprises part of a fuel system for a large aircraft.

6. A cryosystem for cryogenic liquids which contain small amounts of foreign fluids with higher melting and boiling points, the cryosystem comprising:

cryogenic tank means for holding cryogenic fluid;

pipeline means connected to said tank for distributing cryogenic fluid, said pipeline means including pipeline wherein a majority of a length of said pipeline outside said tank is sloped toward said tank in pipeline slope areas, a siphon-like area of said pipeline being provided between said slope areas;

a pump connected to said pipeline means;

a valve and a filter connected to said pipeline means; and drain means for draining said pipeline at a drain rate, said drain means including openings or drain lines, said drain means being connected to said pipeline at said siphon-like area and adjacent to said valve and said filter, from which the cryogenic liquid and the foreign fluids cannot flow back to said tank under action of gravity, said drain means opening into one of said tank and/or into at least one additional collection tank.

7. Cryosystem in accordance with claim 6, wherein a section of said pipeline extending inside said tank is also sloped, at least in some areas, toward an upstream pipeline end.

8. Cryosystem in accordance with claim 6, wherein said drain means comprises drain openings and drain lines connected to said pipeline, said drain openings opening into said tank and said drain lines terminating at an outlet side into areas of the tank through which flow passes with certainty during the filling of the tank in order to eliminate enrichments of foreign fluids in the solid and/or liquid form which are present there by distribution and dissolution.

9. Cryosystem in accordance with claim 7, wherein said drain means comprises drain openings and drain lines connected to said pipeline, said drain openings opening into said tank and said drain lines terminating at an outlet side into areas of the tank through which flow passes with certainty during the filling of the tank in order to eliminate enrichments of foreign fluids in the solid and/or liquid form which are present there by distribution and dissolution.

10. A cryosystem for cryogenic liquids which contain small amounts of foreign fluids with higher melting and boiling points, the cryosystem comprising:

a cryogenic tank; a pipeline connected to the tank; a unit including at least one of a pump, a valve and a filter, said unit being connected to one of said cryogenic tank and said pipeline, a majority of a length of said pipeline outside said tank being sloped toward said tank in pipeline slope areas; a siphon-like area of said pipeline being provided between said slope areas; and a drain for draining said pipeline at a drain rate, said drain including openings or drain lines, said drain being connected to said pipeline at said siphon-like area and adjacent to said unit, from which the cryogenic liquid and the foreign fluids cannot flow back to said tank under the action of gravity, said drain opening into one of said tank and/or into at least one additional collection tank.

* * * * *